(12) United States Patent
McAdoo

(10) Patent No.: US 6,560,858 B1
(45) Date of Patent: May 13, 2003

(54) TRUSS TABLE APPARATUS WITH AUTOMATIC TRUSS MOVEMENT ASSEMBLY AND METHOD

(75) Inventor: David L. McAdoo, Alvarado, TX (US)

(73) Assignee: Alpine Engineered Products, Inc., Pompano Beach, FL (US)

(*) Notice: Subject to any disclaimer, the term of this patent is extended or adjusted under 35 U.S.C. 154(b) by 73 days.

(21) Appl. No.: 09/693,073

(22) Filed: Oct. 20, 2000

(51) Int. Cl.[7] ................................................. B23P 21/00
(52) U.S. Cl. .............................. 29/772; 29/787; 29/795; 29/281.3; 29/897.31; 29/429; 269/910
(58) Field of Search ........................ 29/897.31, 897.312, 29/787, 795, 281.1, 281.3, 281.5, 772, 429, 430, 464, 466, 468; 100/173, 913, 144; 227/152, 154; 269/910, 37

(56) References Cited

U.S. PATENT DOCUMENTS

| | | |
|---|---|---|
| 1,057,799 A | 4/1913 | Holder |
| 2,548,114 A | 4/1951 | MacLeod |
| 3,100,301 A | 8/1963 | Black |
| 3,244,091 A | 4/1966 | Anderson et al. |
| 3,255,943 A | 6/1966 | Sanford |
| 3,375,778 A | 4/1968 | Newman |
| 3,413,703 A | 12/1968 | Sanford |
| 3,583,588 A | 6/1971 | Royal, Sr. |
| 3,709,762 A | 1/1973 | Chandler |
| 3,751,794 A | 8/1973 | Kay |
| 3,866,530 A | 2/1975 | Moehlenpah |

(List continued on next page.)

FOREIGN PATENT DOCUMENTS

EP    0 909 617 A2    4/1999

OTHER PUBLICATIONS

"The Floor Trussmaker" advertisement, copyright Apr., 1997 by Tee–Lok Corporation—2 pages.
"Tee–Floor" advertisement, copright Aug., 1997 by Tee–Lok Corporation—2 pages.
"The Fat man Floor Truss Assembly System" advertisement, Jan. 20, 1971 by Production and Equipment and Engineering Co.—7 pages.

Primary Examiner—S. Thomas Hughes
Assistant Examiner—T. Nguyen
(74) Attorney, Agent, or Firm—Crutsinger & Booth

(57) ABSTRACT

A truss assembly apparatus and method for assembling a truss utilizing the apparatus are presented, the apparatus comprising a truss table having a work surface with a first and second assembly zone. A first clamping assembly has a movable first clamp rail for clamping the truss in the first assembly zone, the first clamp rail having at least one flip-arm recess therein. A flip-over assembly has at least one flip-over arm movable relative to the work surface for moving the truss from a first truss position-in the first assembly zone to a second truss position in the second assembly zone, the flip-over arm movable into the flip-arm recess of the first clamp rail. The apparatus may have a plurality of such recesses and flip arms. The truss assembly apparatus may further comprise a second clamping assembly having a movable second clamp rail for clamping the truss in the second assembly zone, the second clamp rail having a flip-arm recess therein movable into the flip-arm recess of the second clamp rail.

16 Claims, 14 Drawing Sheets

U.S. PATENT DOCUMENTS

| | | |
|---|---|---|
| 3,896,717 A | 7/1975 | Schmitt |
| 3,945,630 A | 3/1976 | Brunemann |
| 3,990,691 A | 11/1976 | Wolf |
| 4,024,809 A | 5/1977 | Moehlenpah |
| 4,044,093 A | 8/1977 | Jureit |
| 4,063,498 A | 12/1977 | Labellarte |
| 4,084,498 A | 4/1978 | Weaver |
| 4,084,499 A | 4/1978 | Moehlenpah |
| 4,089,107 A | 5/1978 | Sanford |
| 4,148,471 A | 4/1979 | Werner |
| 4,252,058 A | 2/1981 | Tison |
| 4,295,269 A | 10/1981 | Wright |
| 4,305,538 A | 12/1981 | Schultz et al. |
| 4,339,117 A | 7/1982 | Tison |
| 4,383,680 A | 5/1983 | Bradeland |
| 4,394,952 A | 7/1983 | Crane |
| 4,492,016 A * | 1/1985 | Smets et al. |
| 4,623,083 A | 11/1986 | Pagano |
| 4,627,564 A | 12/1986 | Bowser |
| 4,645,113 A | 2/1987 | Webber |
| 4,660,815 A | 4/1987 | Rosser |
| 4,824,004 A | 4/1989 | Hanson |
| 4,829,651 A | 5/1989 | Shirai |
| 4,846,923 A | 7/1989 | Lines |
| 4,943,038 A * | 7/1990 | Harnden |
| 4,998,336 A | 3/1991 | Papsdorf |
| 5,170,558 A | 12/1992 | Hubbard |
| 5,234,204 A * | 8/1993 | Hunt |
| 5,350,162 A | 9/1994 | Cushing |
| 5,355,575 A * | 10/1994 | Self |
| 5,379,513 A | 1/1995 | Thompson et al. |
| 5,555,617 A * | 9/1996 | Pope |
| 5,600,882 A | 2/1997 | Beane |
| 5,617,622 A | 4/1997 | Anderson |
| 5,676,358 A | 10/1997 | Shamblin et al. |
| 5,725,205 A * | 3/1998 | O'berg |
| 5,768,769 A | 6/1998 | Shamblin |
| 5,772,192 A | 6/1998 | Hoffmann |
| 5,933,957 A | 8/1999 | Haase |
| 5,947,460 A | 9/1999 | Williams |
| 6,079,325 A | 6/2000 | Le Poire et al. |
| 6,260,263 B1 | 7/2001 | Haase |

* cited by examiner

TRUSS TABLE APPARATUS WITH AUTOMATIC TRUSS MOVEMENT ASSEMBLY AND METHOD

TECHNICAL FIELD

The present invention relates in general to improvements in apparatus and methods for fabricating structural components. More particularly, this invention concerns a truss assembly apparatus and method having an automated truss movement assembly.

BACKGROUND OF INVENTION

Prefabricated building components, now widely utilized in the construction industry, are typically assembled at a manufacturing facility and then transported to the job site for incorporation into a building structure. Prefabricated trusses for use as roof or floor supports are assembled from pre-cut wooden chord and web members positioned in abutting relationship and connected together using toothed fastener plates.

Truss assembly devices have been developed for performing this task semi-automatically. The pre-cut wooden members are positioned manually over a support surface and clamped in place, after which connector plates are laid over the abutting joints. The connector plates are then embedded into the members with a gantry or other press to secure the joints on one. side. The semi-complete truss is then turned over and similarly secured at the joints on the opposite side.

Various arrangements or truss tables in gantry presses have been employed in the truss assembly devices of the prior art. The prior truss assembly devices, however, have several shortcomings. The clamping methods utilized by the prior machines have been found inadequate in terms of adjustability, positive actuation and the like. In addition, the prior machines have been relatively slow in operation because movement of the trusses on the table during fabrication has been done primarily manually.

There exists a need for a new and improved truss assembly apparatus.

SUMMARY OF THE INVENTION

A truss assembly apparatus and method for assembling a truss utilizing the apparatus are presented, the apparatus comprising a truss table having a work surface with a first and second assembly zone. A first clamping assembly has a movable first clamp rail for clamping the truss in the first assembly zone, the first clamp rail having at least one flip-arm recess therein. A flip-over assembly has at least one flip-over arm movable relative to the work surface for moving the truss from a first truss position in the first assembly zone to a second truss position in the second assembly zone, the flip-over arm having a lower end movable into the flip-arm recess of the first clamp rail. The flip-over arm may be movable between a home position adjacent the work surface and an extended position, wherein the lower end of the flip arm is positioned in the flip-arm recess when the flip-over arm is in the extended position. The flip-over arm may be perpendicular to the work surface when the flip-over arm is in the extended position. The apparatus may have a plurality of such recesses and flip arms. The truss assembly apparatus may further comprise a second clamping assembly having a movable second clamp rail for clamping the truss in the second assembly zone, the second clamp rail having. a flip-arm recess therein, the lower end of the flip-over arm movable into the flip-arm recess of the second clamp rail.

The truss assembly apparatus may further comprise a lift-out assembly having a lift-out arm movable relative to the work surface for moving a truss from the second truss position to a finished position spaced from the work surface. The lift-out arm has a first end movable through a lift-out arm recess in the second clamp rail. The lift-out assembly may comprise a plurality of lift-out arms movable through a plurality of corresponding lift-out recesses.

The truss assembly apparatus may also have flip-over arms with clamp-rail recesses, wherein the flip-over arms are movable such that at least a portion of the first clamp rail is positioned in the clamp-rail recess of the flip-over arms. The flip-over arm may be movable such that at least a portion of the second clamp rail is positioned in the clamp-rail recess as well.

BRIEF DESCRIPTION OF THE DRAWINGS

Drawings of a preferred embodiment of the invention are annexed hereto, so that the invention may be better and more fully understood, in which.

Figure 1:
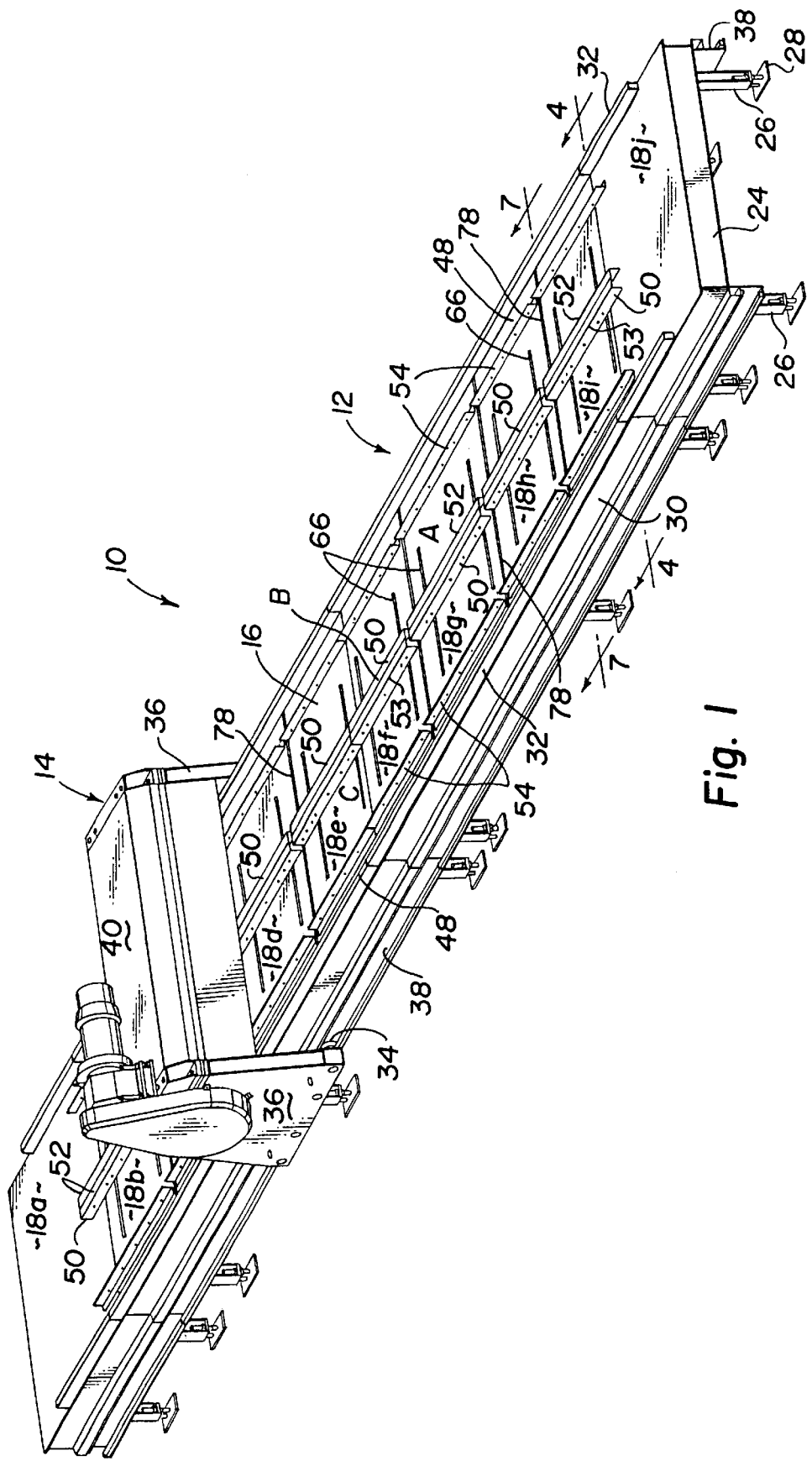
FIG. 1 is a perspective view of a truss assembly apparatus.

Numeral references are employed to designate like parts throughout the various figures of the drawing. Terms such as "left," "right," "clockwise," "counter-clockwise," "horizontal," "vertical," "up" and "down" when used in reference to the drawings, generally refer to orientation of the parts in the illustrated embodiment and not necessarily during use. The terms used herein are meant only to refer to relative positions and/or orientations, for convenience, and are not to be understood to be in any manner otherwise limiting. Further, dimensions specified herein are intended to provide examples and should not be considered limiting.

DESCRIPTION OF A PREFERRED EMBODIMENT

The invention is herein described with reference to the accompanying drawings and is not intended to limit the scope of the claimed invention, but is intended to describe particular embodiments to disclose the best mode of the invention to those skilled in the art.

Figure 2:
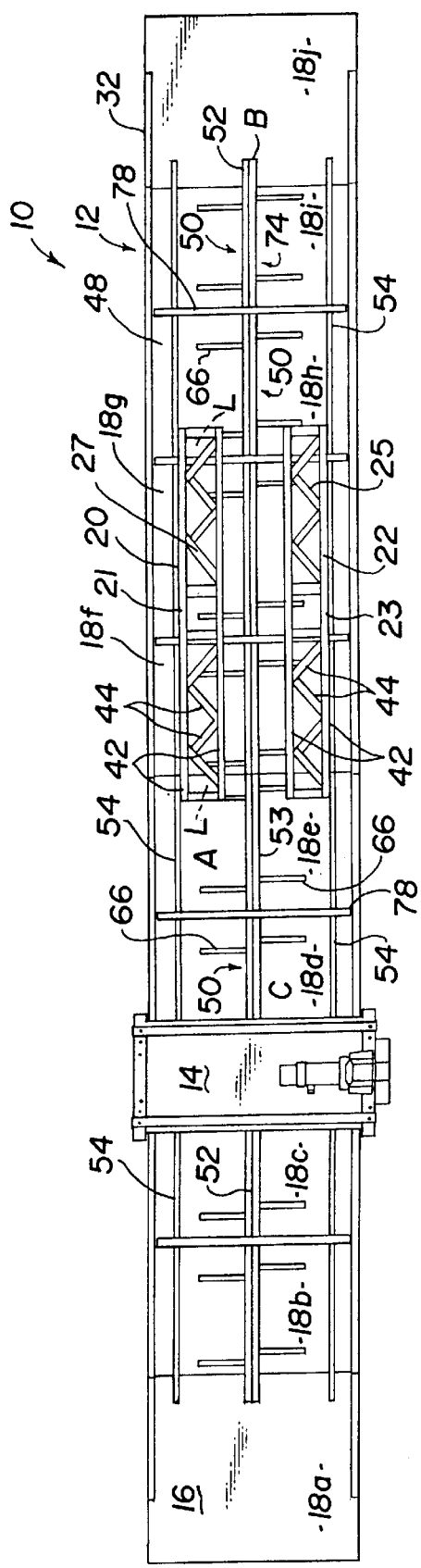
FIG. 2 is a top plan view of a truss assembly apparatus.

FIGS. 1 and 2 show a truss assembly apparatus 10 for semi-automatic manufacture of prefabricated structural components, particularly wooden trusses and joists. The truss assembly apparatus 10 comprises a truss table 12 and a table gantry press 14 supported on the table for movement there along.

The work surface 16 of the truss table 12 is defined by table plates 18 a–j, which are arranged end-to-end. Table plates 18 b–i provide working space for assembly of the trusses 20 and 22, while plates 18 a and 18 j provide staging areas for the table gantry press 14. The table may be designed to any desired length. The plates 18 are supported by a plurality of cross-members 24 which are mounted to the legs 26 of the table. Each leg 26 of the table 12 preferably includes a foot 28 threaddedly attached thereto for height adjustment and leveling of the truss table 12 (best seen in FIG. 4). Side beams 30 extend longitudinally beneath the table plates 18. Outer rails 32 extend longitudinally above the table work surface 16 along the outer edges of the table plates 18. Clamping assemblies 50 are attached to the table 12, as shown.

The table gantry press 14 straddles the work surface 16 of the truss table 12 and is supported to run along the length of the table. Gantry wheels 34, located in the gantry arms 36, roll along the gantry tracks 38, which are mounted to the truss table 12. A roller press (not shown) located in the gantry body 40 presses downwardly on the truss table 12 as the gantry press 14 passes along the table length.

Figure 3:
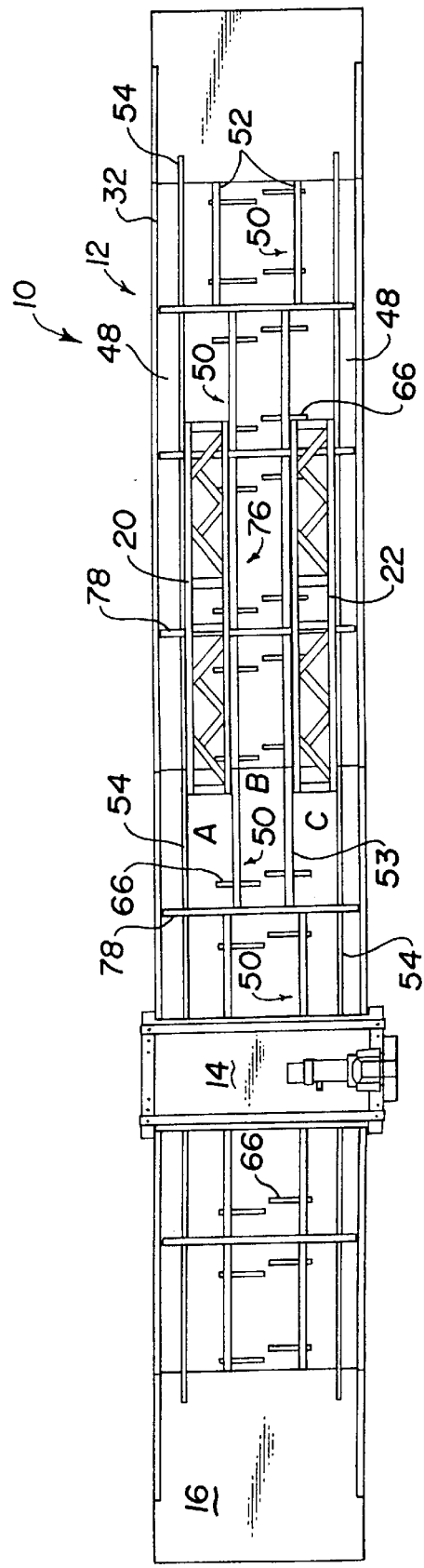
FIG. 3 is a top plan view of a truss assembly apparatus with clamping assemblies actuated.
Figure 4:
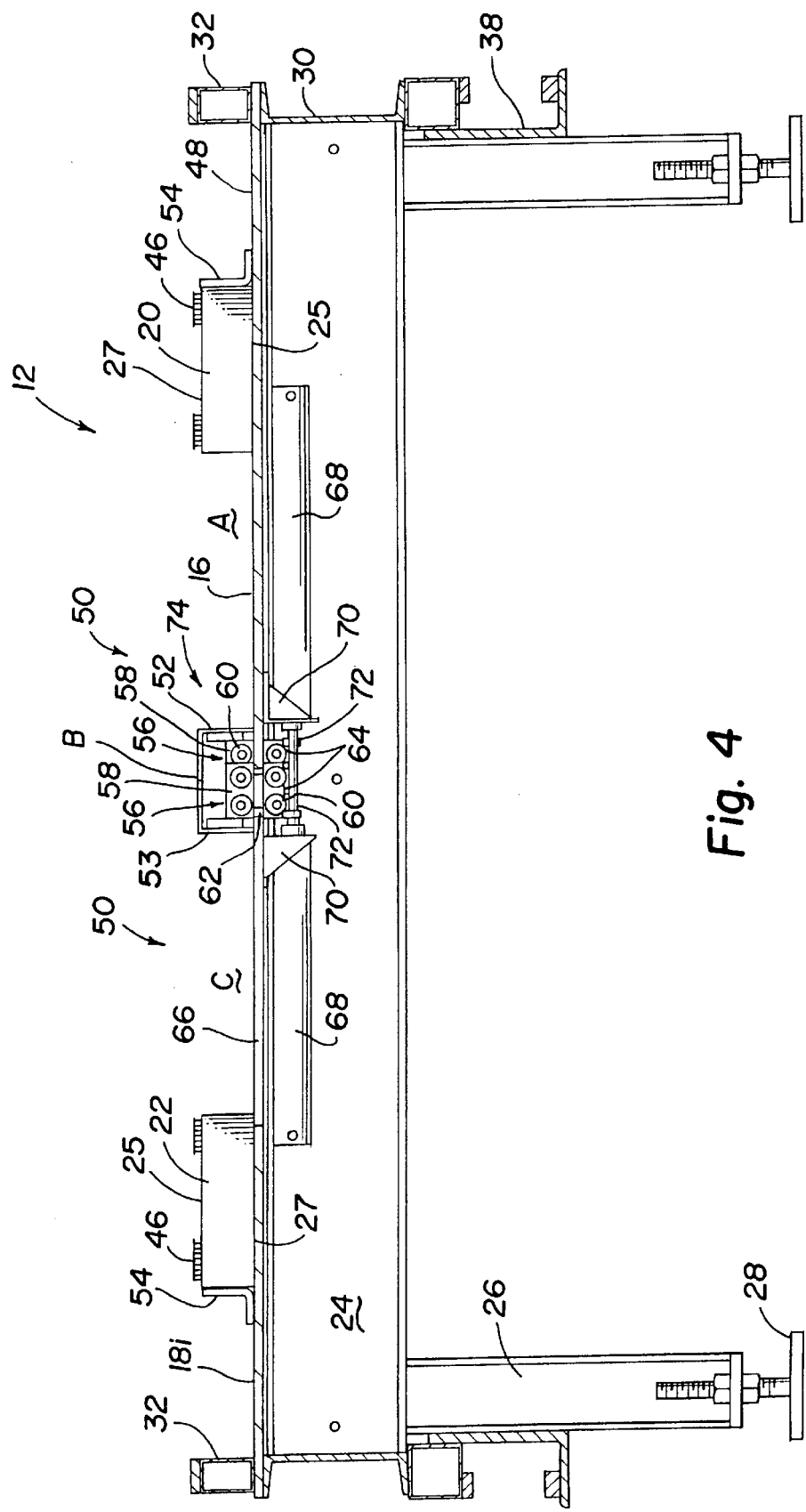
FIG. 4 is an elevational sectional view of a truss table with clamping assemblies.
Figure 5:
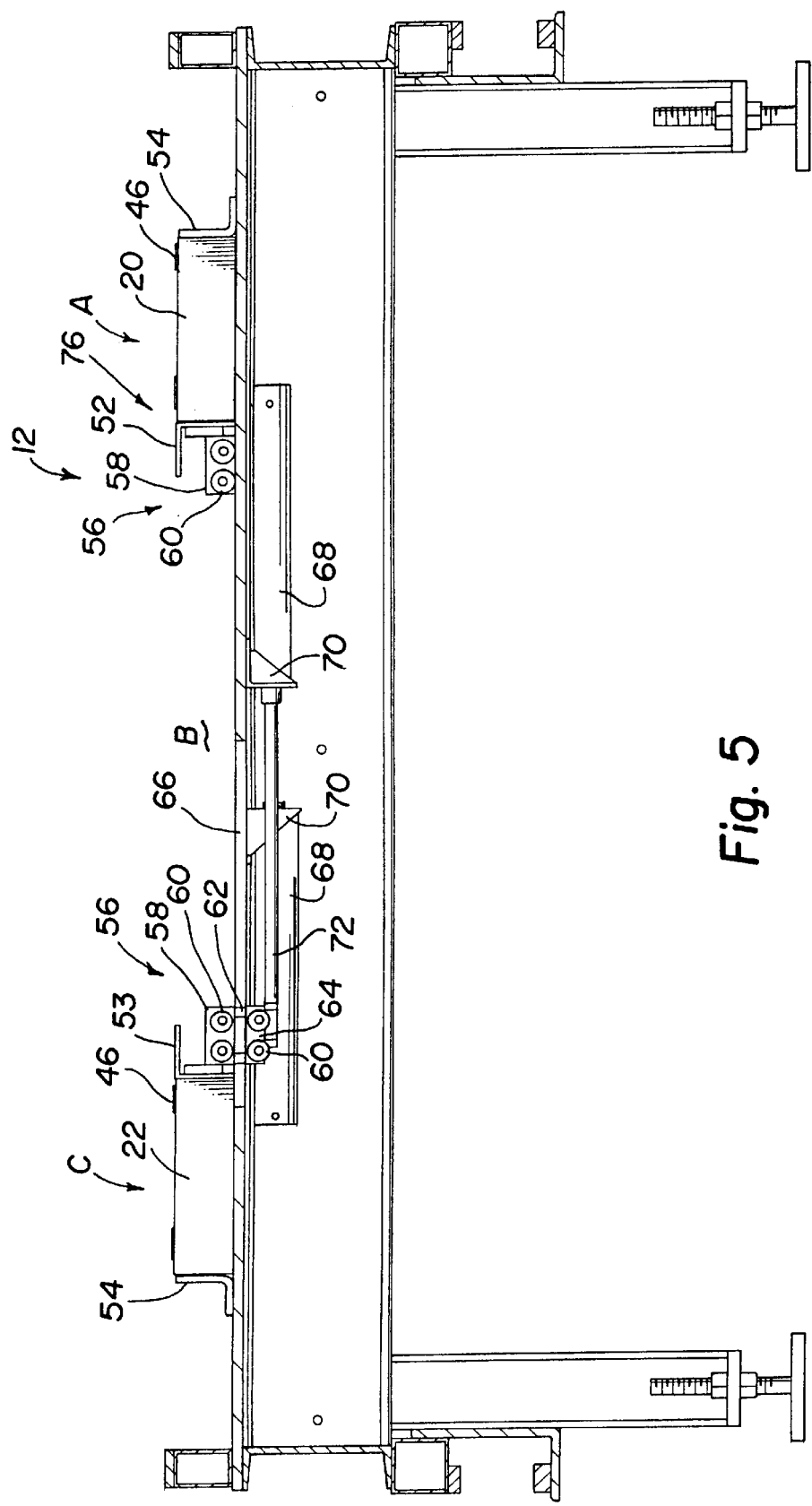
FIG. 5 is an elevational sectional view of a truss table with trusses clamped by the clamping assemblies.

Referring to FIGS. 2 and 3, truss table 12 is divided into three longitudinal zones A, B, and C by the clamping assemblies 50. In the preferred embodiment, two clamping assemblies 50 are mounted on each of the support plates 18. Assembly zones A and C on each plate 18 are coincident with the inner jigs 52 and 53 and outer jigs 54 of the clamping assemblies 50. Intermediate zone B extends between the clamping assemblies 50 and may be reduced to zero area when the clamping assemblies 50 are not actuated to clamp a truss, such as trusses 20 and 22, as seen in FIG. 2 and as will hereinafter be described. During operation of the truss assembly apparatus 10, precut truss chords 42 and webs 44 are manually placed in a first truss position 21 with a first truss face 25 contacting the table surface in zone A and are secured in place by the clamping assembly 50. Toothed connector plates 46, which may be stored in the recessed areas 48 between the outer rails 32 and the outer longitudinal jigs 54, are then placed over the joints between the truss members 42 and 44 (as seen in FIGS. 4 and 5) and subsequently embedded in place by passage of the gantry press 14 over the truss 20. The semi-finished truss 20 is then unclamped, rotated along its longitudinal axis L, and placed in zone C so that the embedded connector plates 46 are positioned downwardly. The semi-finished truss 20, now in the second truss position 23, the location of truss 22 in FIG. 2, with a second truss face 27 contacting the table surface is clamped in place by the clamping assembly 50 and secured at the joints on the now upwardly facing side of the truss 22 with connector plates 46 embedded therein by another passage of the gantry press 14. The now completed truss 22 is unclamped, removed from zone C, and moved off of the truss table 12 for storage. During typical use of the truss assembly apparatus 10, connector plates 46 are pressed into trusses 20 and 22 in both zones A and C during a single passage of the gantry press 14.

Two clamping assemblies 50 are mounted on each plate 18, as shown in FIGS. 1 and 2. The details of the clamping assemblies 50 are best illustrated in FIGS. 4 and 5. Each clamping assembly 50 includes an inner longitudinal jig, such as inner jigs 52 and 53 and an outer longitudinal camber inducing rail or jig 54, each of which may be divided into a plurality of longitudinally spaced jigs, as shown. The jigs 52, 53 and 54 may be of angle irons oriented as shown. The outer jigs 54 are attached to the working surface 16 of the truss table 12. Preferably the outer jigs are bolted, or otherwise removably attached, to allow reconfiguration of the jigs as desired. The inner jigs 52 and 53 are slidably mounted to the truss table 12. In the preferred embodiment, each of the inner jigs 52 and 53 are mounted to a truck assembly 56 including an upper jig truck 58 which is supplied with truck wheels 60. The upper truck 58 is connected, such as with truck spacers 62, to a lower jig truck 64 which is similarly supplied with wheels 60. The jig trucks 58 and 64 straddle the clamping slot 66 and the wheels 60 allow the trucks 58 and 64 to roll along the upper and lower surfaces of the table plates 18, respectively. The truck spacers 62 extend through clamping slot 66 which is formed in the table plate 18 in a transverse direction across the truss table 12 as best seen in FIGS. 1 and 2. Other methods of slidable mountings, such as friction mountings, may be used without departing from the spirit of the invention. The jig trucks 58 and 64 are attached to a jig actuator, such as the air cylinder 68 shown. Other actuators may be employed, and may be mounted above or below the table surface, although the actuator design illustrated is preferred for reasons hereinafter explained. The air cylinders 68 are mounted under the surface of the table plates 18 by jig actuator brackets. The extendable air cylinder jig rods 72 are connected to the truck assemblies 58 and 64.

Turning to the clamping assembly in zone A, when the air cylinder 68 is in a retracted position, as in FIGS. 2 and 4, the inner jig 52 is positioned near the center of the truss table 12 in a home position 74 as shown. As the air cylinder 68 is actuated, the rod 72 extends outwardly, moving the truck assembly 56, which in turn moves the inner jig 52, across the truss table 12 along the clamping slot 66 toward the outer jig 54 to an extended or clamped position 76, as seen in FIG. 5. The air cylinder 68 will extend to its full length or until the inner jig 52 encounters and clamps truss into place in zone A. Similarly, a truss 22 in zone C may be clamped in place by actuation of the air cylinder 68, of the clamping assembly in zone C which will move the truck assembly 56 and inner jig 53 toward outer jig 54. The trusses 20 and 22 are unclamped after the gantry press 14 has embedded the connector plates 46 into the truss by retraction of the air cylinder to their retracted position, seen in FIG. 4.

Referring back to FIG. 2, each inner jig 52 and 53 is preferably activated independently with a corresponding air cylinder 68. The clamping assemblies 50 act in unison to hold the trusses 20 and 22 in place. Where inner jigs 52 and 53 do not encounter a truss, they are extended as far as the air cylinder 68 will allow. One of the advantages in having a plurality of clamping assemblies 50 each with a separate inner jig 52 acting on a single truss 20 is explained herein. Floor trusses, such as those seen in FIGS. 1–3, have parallel top and bottom chords 42. In low-slope roofing applications, however, the members 42 are not parallel. Sloped chord trusses can be assembled in the present truss assembly apparatus 10 because the plurality of clamping assemblies 50 will contact the sloping member 43 at more than one point on the truss, or along its entire length, as shown. A single longitudinal inner jig which ran the length of the table, such as is common, would only contact the sloped member 43 at a single location. The inner jigs 52 and 53 of the invention may be pivotally attached to the jig trucks 58, if desired, to allow for contact between the jigs and truss members with greater slopes.

Once the gantry press 14 has embedded the connector plates 46 into the trusses in zones A and C, the truss in zone C must be lifted out and removed from the table. The truss in zone A must be lifted out, turned over and placed in zone C for completion of the fabrication.

Figure 6:
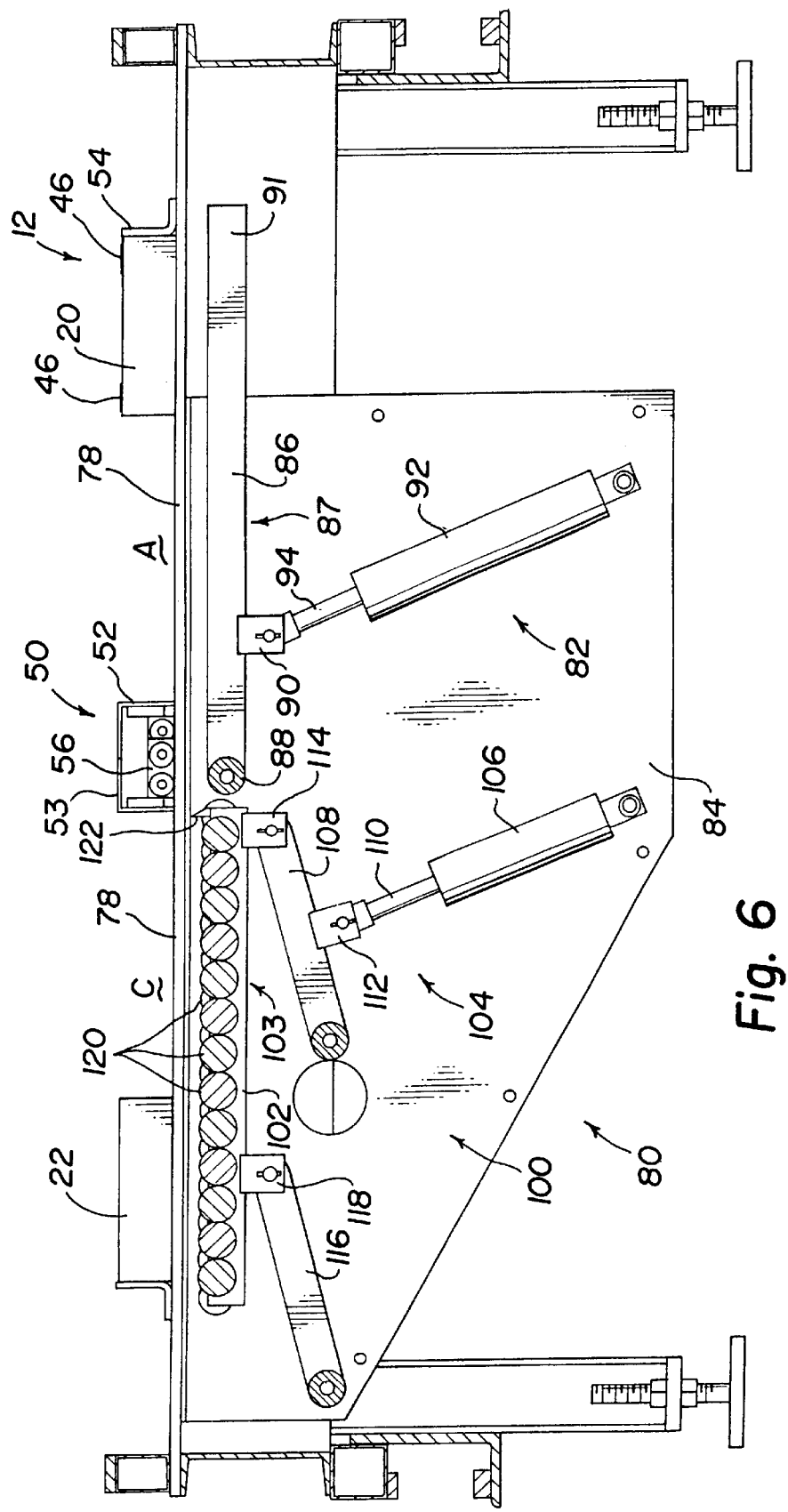
FIG. 6 is an elevational sectional view of a truss table with a truss movement assembly.
Figure 7:
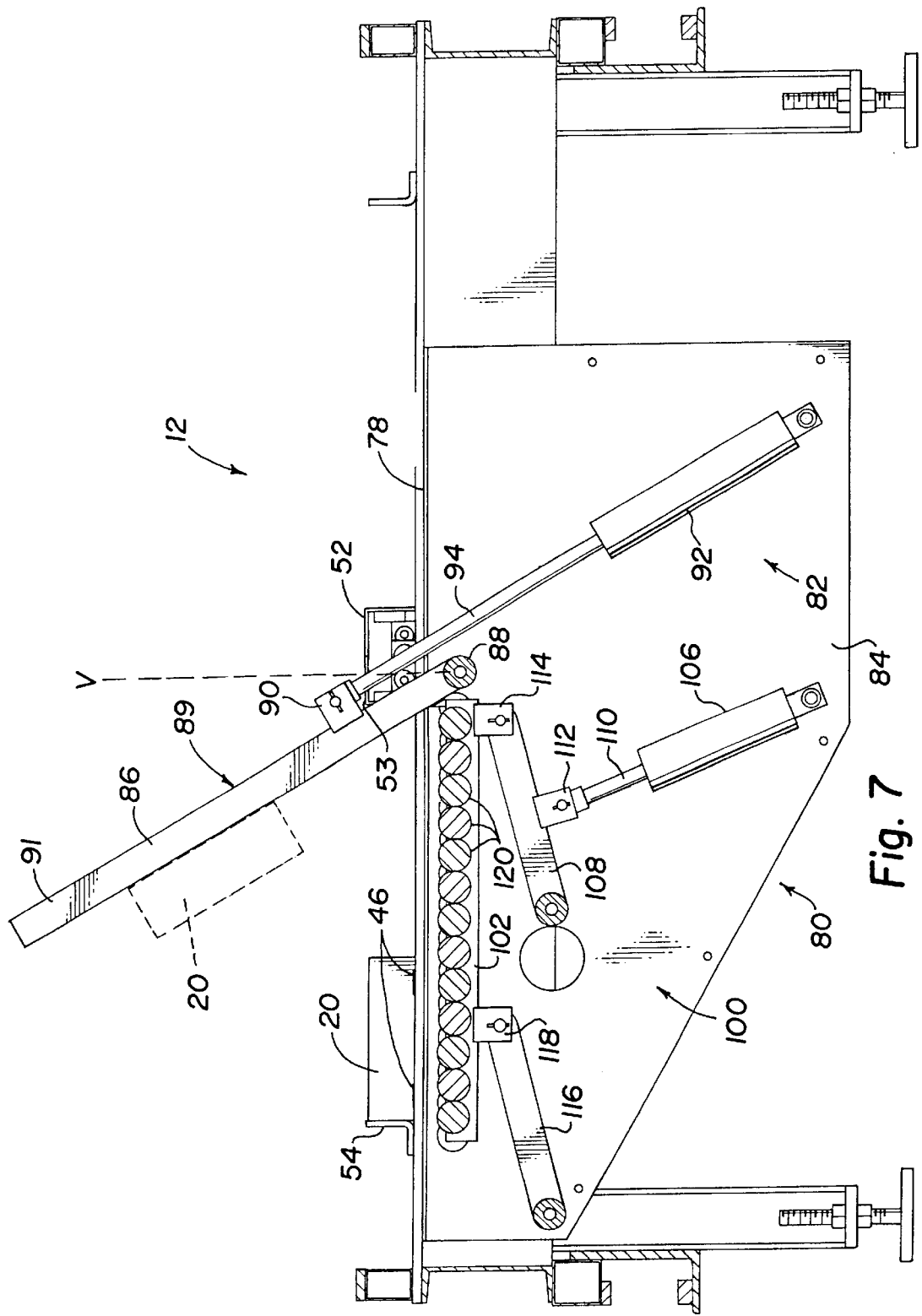
FIG. 7 is an elevational sectional view of a truss table with a truss movement assembly with the flip-over assembly actuated.
Figure 8:
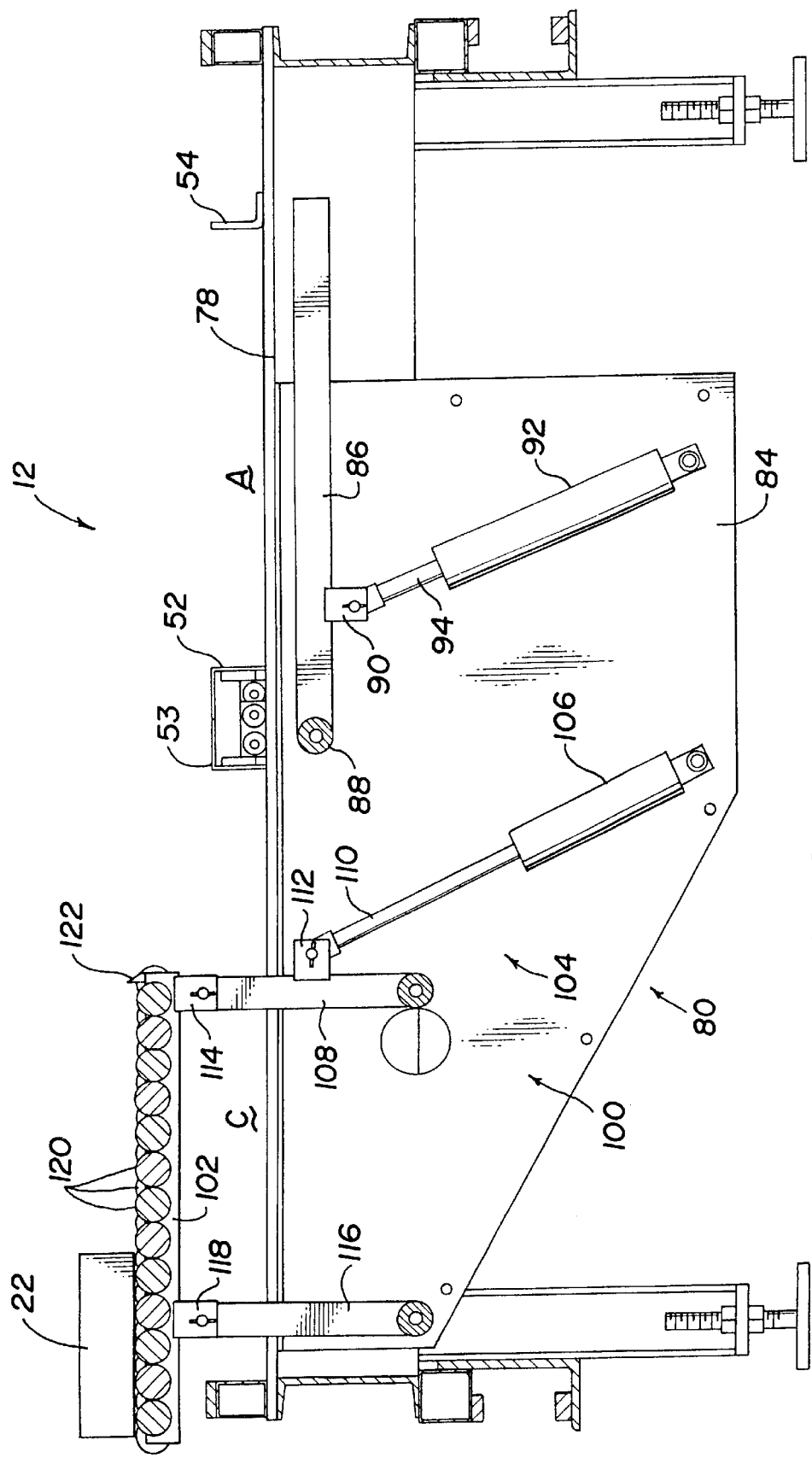
FIG. 8 is an elevational sectional view of a truss table with a truss movement assembly with the lift-out assembly actuated

Movement of the trusses is accomplished with the truss movement assembly 80, seen in FIGS. 6–8, which comprises a flip-over assembly 82 and a lift-out assembly 100.

The flip-over assembly 82 is located adjacent zone A and is attached to the lower surface of the truss table 12 by the truss movement assembly bracket 84. The flip-over assembly 82 comprises an elongate flip-over arm 86 which is connected at one end by a flip-over arm pivot mounting 88 to the movement assembly bracket 84 adjacent the lower surface of the table 12. A flip-over arm bracket 90 pivotally connects the flip-over arm 86 at a point removed from the flip-over pivot mounting 88 to one end of the flip-over actuator 92. In the preferred embodiment, the flip-over actuator is an air cylinder 92 having one end pivotally connected to the movement assembly bracket 84 and the rod end 94 connected to the flip-over arm bracket 90.

While the truss 20 is being assembled and pressed, the flip-over assembly 82 is in a home position 87, as seen in FIG. 6, wherein the flip-over arm 86 is positioned not to interfere with assembly of the truss 20. The flip-over arm 86 is pivoted to the extended position 89, seen in FIG. 7, by the extension of the rod 94 of the air cylinder 92. The flip-over arm passes through assembly slot 78 to contact the truss 20. The flip-over arm 86 and actuator are arranged such that the flip-over arm rotates through and preferably past the vertical plane V so that the truss 20 is rotated longitudinally before falling from the flip-over arm 86 into zone C. Preferably, at least the upper end 91 of arm 86 moves to a position over zone C, as shown in FIG. 7. The motion and extended position 89 of the flip-over arm 86 thus lifts the truss 20 from zone A, rotates and deposits it such that the connector plates applied to the truss face downwardly in zone C.

Prior to the actuation of the flip-over arm 86, the movable inner jigs 52 and 53 are brought to their home position at the center of the table. With the inner jigs so arranged, abutting one another, the area of zone B, evident when the braces are clamping the trusses as in FIG. 5, is reduced greatly, or preferably completely, as in FIG. 6. Many truss assembly mechanisms are unable to greatly reduce or eliminate the area of zone B because of the jig mechanisms disposed in the intermediate zone. The present invention eliminates the area of zone B by mounting the clamping assembly actuators below the table surface and moving the jigs via the small jig trucks actuated through the clamping slots. Because of this feature, the flip-over arm is designed to deposit the truss directly to zone C. In prior art inventions the truss is deposited at least partially into zone B requiring manual relocation of the truss into zone C for further assembly.

The lift-out assembly 100 is positioned adjacent zone C and is attached to the truss movement assembly bracket 84 which is mounted to the table 12 below the work surface 16 as shown. The lift-out assembly 100 comprises a lift-out arm 102 and a lift-out actuator assembly 104. The lift-out arm 102 is seen in its home position 103 in FIG. 6, wherein the lift-out arm 102 does not interfere with assembly of the truss 22. After completion of assembly of the truss 22 the lift-out actuator assembly 104 is activated to raise the lift-out arm 102 and move it laterally towards the outer rail 32 at the edge of the table 12 into the extended or finished position 105 seen in FIG. 8. The lift-out arm 102 acts on the truss 22 after passing from below the table surface 16 to above the table surface through assembly slot 78. The lift-out arm 102 in turn moves the truss 22 to a position out of zone C and toward the table edge for removal to a conveyor assembly or to storage. The lift-out arm 102 is designed to raise the truss 22 above the outer rail 32. Also, the lift-out arm 102 is preferably designed such that in the extended position the lift-out arm 102 extends slightly past the outer rails 32 of the table for ease of removal of the truss from the table.

The lift-out actuator assembly 100, in the preferred embodiment, comprises a lift-out actuator, such as the air cylinder 106, pivotally connected at one end to the movement assembly bracket 84 and pivotally attached at the other end to the lift-out power arm 108.

In the preferred embodiment, the actuator is an air cylinder, but other actuating devices may be employed. The rod end 110 of the air cylinder 106 is pivotally attached to the lift-out power arm 108 through the cylinder bracket 112. The lift-out power arm 108 is pivotally mounted to the movement bracket 84 at one end and pivotally attached to the lift-out arm 102 at the other end through the power arm bracket 114. Similarly, the support arm 116 is pivotally connected to the movement assembly bracket 84 at one end and to the lift-out arm 102 at the other end through a support arm bracket 118. When the air cylinder 106 is actuated, the rod end 110 extends outwardly, pivoting the power arm 108 which in turn lifts and laterally moves the lift-out arm 102. The support arm 116 acts to raise and laterally move the lift-out arm in conjunction with the power arm to the extended position. Actuator assemblies other than the described system may be used without departing from the spirit of the invention.

Preferably, the lift-out arm 102 has a plurality of rollers 120 connected thereto to assist the user in moving the truss 22 off of the lift-out arm 102. The lift-out arm 102 also preferably has a stop block 122 attached to the lift-out arm 102 at its innermost end. The stop block 122 prevents the truss from rolling from the rollers 120 onto the truss table 12.

Turning to FIGS. 9–15, as described previously herein, the two inner jig rails 52 and 53 can each comprise a single longitudinal inner jig running the length of the truss table 12 or each can be divided into a plurality of separate inner jigs. Where the inner jigs 52 and 53 are separated into a plurality of separate jigs, the assembly slots 78 and the gaps between the separate inner jigs 52 and 53 allow the flip-over arm 86 to rotate past the inner jigs 52 and 53 and into zone C, as best shown in FIG. 7. It is desirable for the flip-over arm to rotate into or close to zone C to ensure that the truss 20 is displaced from zone A fully into zone C. When the inner jigs 52 and 53 are each a single longitudinal jig made of unmodified angle iron, the flip-over arm cannot rotate into zone C, but is limited in its movement by the inner jigs 52 and 53. With modifications to the angle irons of the inner jigs 52 and 53, as shown in FIGS. 9–15, each inner jig 52 and 53 can move as a unitary length of jig while still allowing the flip-over arm 86 to rotate past the inner jigs 52 and 53.

Figure 9:
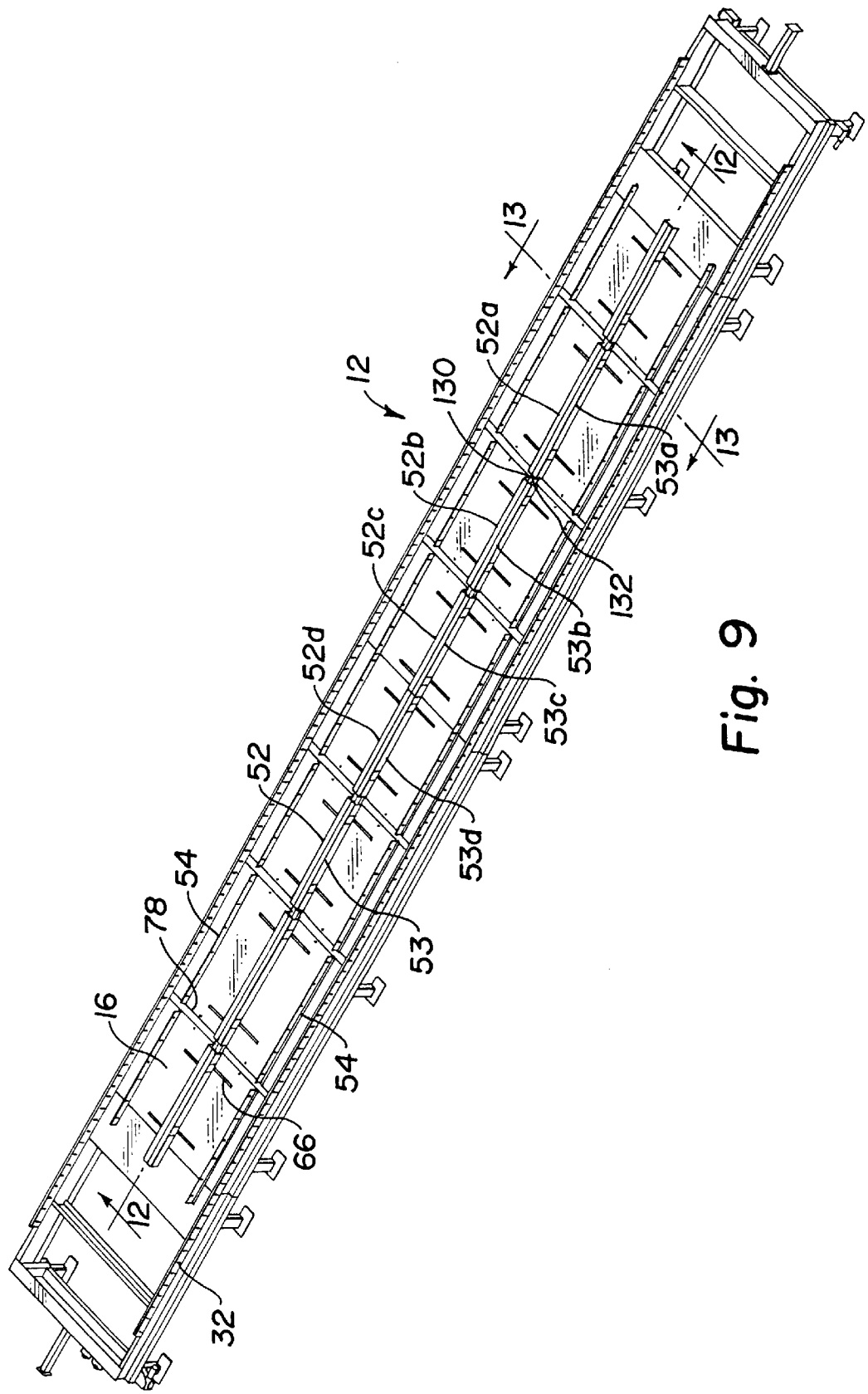
FIG. 9 is an isometric view of a truss table without a gantry press.
Figure 10:
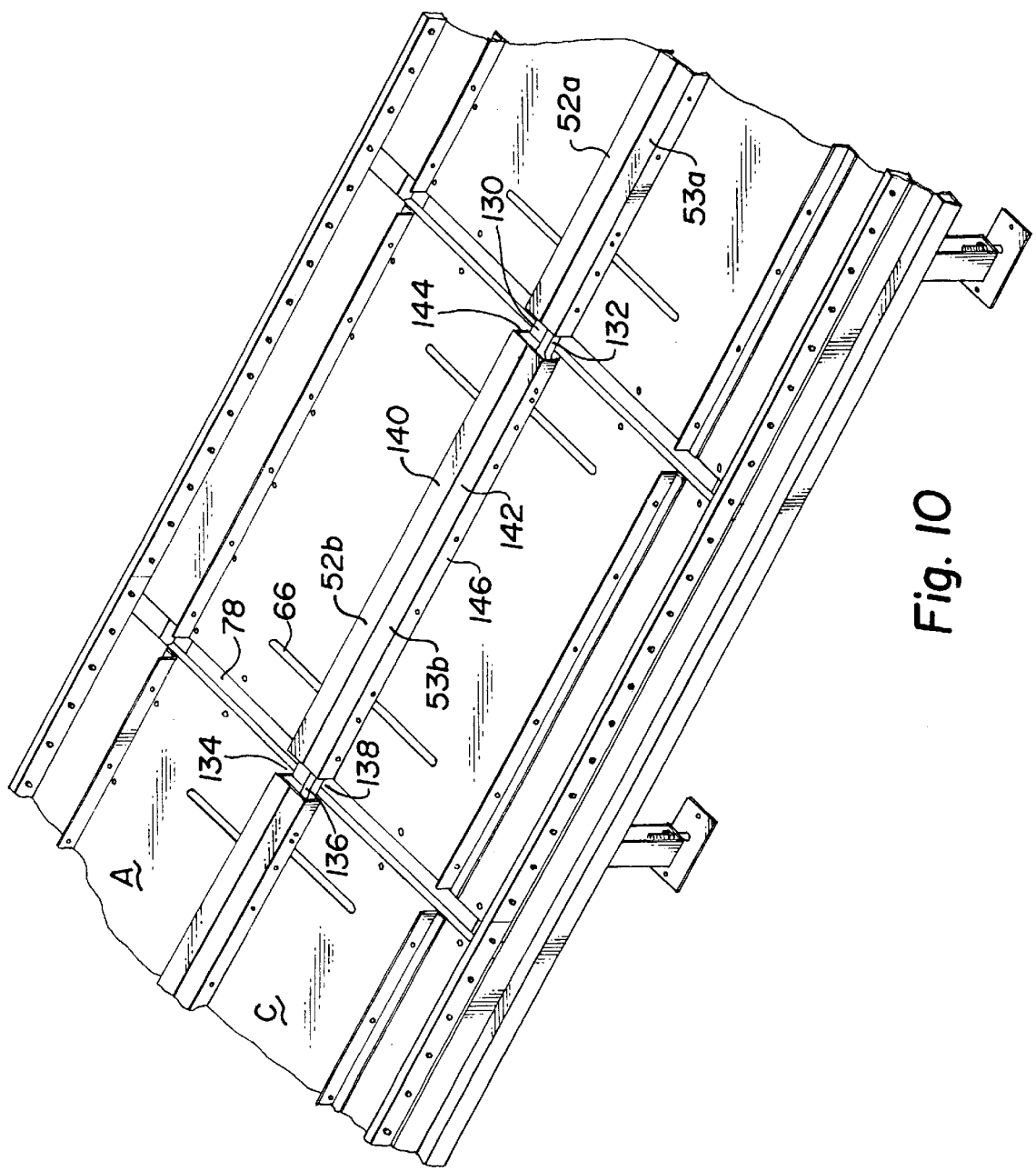
FIG. 10 is a detail view of a truss table having inner jig connectors.

In FIGS. 9 and 10, the truss table 12 is shown without the gantry press 14. Both the inner jig 52 which operates on a truss in zone A and the similar inner jig 53 which operates on a truss in zone C are each unitary longitudinal jigs. Inner jig 52 can be made of angle iron having a top leg 140 and an upright leg 144 which acts as a clamping surface on a truss. Similarly, inner jig 53 has a top leg 142 and an upright leg 146 which acts as a truss clamping surface. Rather than a single piece of angle iron, however, as is common, each jig has been modified to provide recesses into which the flip-over arm 86 can rotate. Inner jig 53 has been further modified to provide a recess through which the lift-out arm can travel. Inner jig sections 52a, b and c are joined together by jig connectors 130 and inner jig sections 53a, b and c are joined together by jig connectors 132. Optionally, inner jig sections 52c and d can be joined together, as can sections 53c and d, or the sections can remain unconnected to effectively separate the inner jigs 52 and 53 into separate units. By selecting which sections of jig are connected, the user can effectively divide the inner jigs into as many or as few independently operating sections as desired.

The shape of connector 130 for inner jig 52 creates flip-over arm recess 134. Similarly, the shape of connector 132 for inner jig 53 creates flip-over arm recess 136. The shape of connector 132 also creates lift-out arm recess 138. These recesses, notches or spaces allow movement of the flip-over arm and lift-out arm into areas adjacent the jig rails as explained herein.

Figure 11:
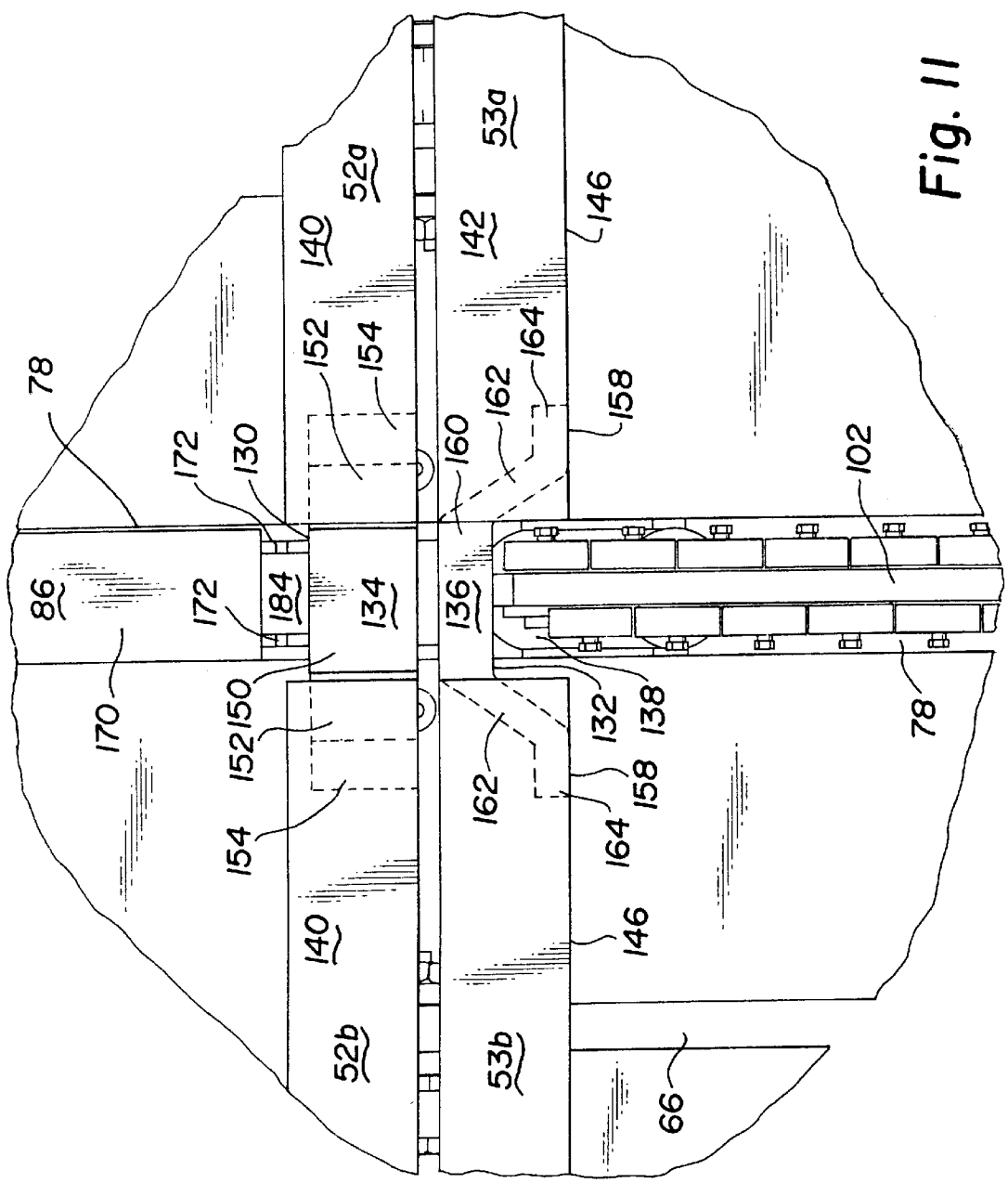
FIG. 11 is a detail top view of the truss table having inner jig connectors.
Figure 12:
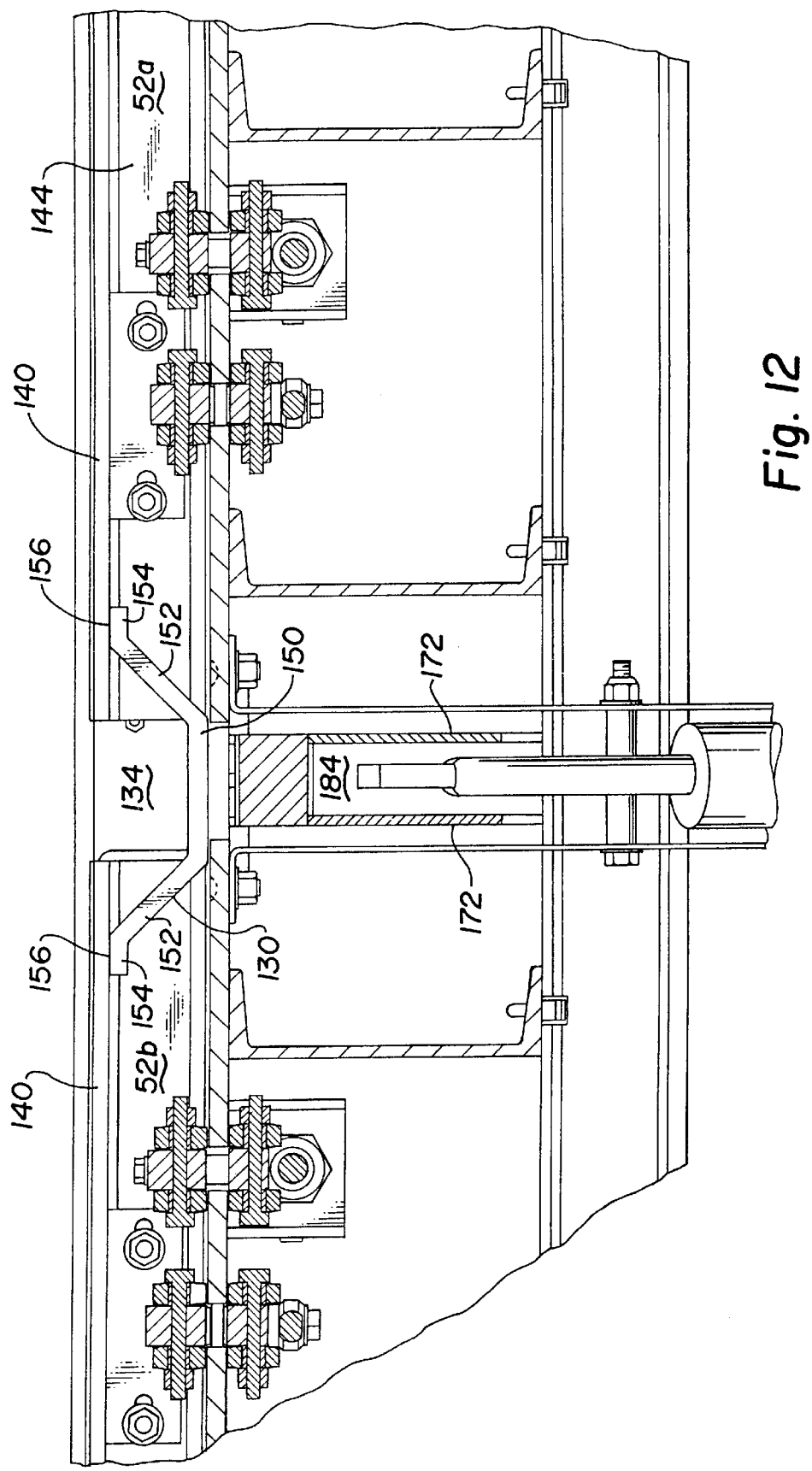
FIG. 12 is a detail elevational sectional view of the truss table taken along line 12—12 of FIG. 9.

FIGS. 11 and 12 more clearly show the shape of jig connectors 130 and 132. FIG. 11 is a detail top view of the truss table and FIG. 12 is a cross-sectional detail view taken along line 12—12 in FIG. 9. Jig connector 130 for inner jig 52 has a clearance is portion 150, two connector arm portions 152 and two fastener portions 154. The fastener portions 154 preferably create a flat interface with the top leg 140 of the inner jig 52. Welds at 156, seen in FIG. 12, securely fasten the jig connector 130 to the separate sections of the inner jig 52a and b. Other types of fastener may be used as will be obvious to those skilled in the art. Connector arm portions 152 extend between clearance portion 150 and the fastener portions 154. In the preferred embodiment, the connector arms 152 extend from clearance portion 150 at a sloped angle. The slope of the arms 152 provides integrity and rigidity to the inner jig 52 to prevent torquing of the inner jig. The slope of the arms and shape of the connector may be modified as desired without departing from the spirit of the invention.

Similarly, jig connector 132 for inner jig 54 has a clearance portion 160, two connector arm portions 162 and two fastener portions 164. The fastener portions 164 preferably create a flat interface with the upright leg 146 of the inner jig 52. Welds at 158, seen in FIG. 11, securely fasten the jig connector 130 to the separate sections of the inner jig 53a and b. Other types of fastener may be used as will be obvious to those skilled in the art. Connector arm portions 162 extend between clearance portion 160 and the fastener portions 164. In the preferred embodiment, the connector arms 162 extend from clearance portion 160 at a sloped angle, as shown. The slope of the arms 162 provides integrity and rigidity to the inner jig 53 to prevent torquing of the inner jig. The slope of the arms and shape of the connector may be modified as desired without departing from the spirit of the invention.

Flip-arm recesses 134 and 136 and lift-out arm recess 138 can be constructed in ways other than that described. For example, the recesses can be created by cutting or removing portions of the inner jigs. Other methods may be employed, as will be apparent to those skilled in the art, without departing from the spirit of the invention.

Figure 13:
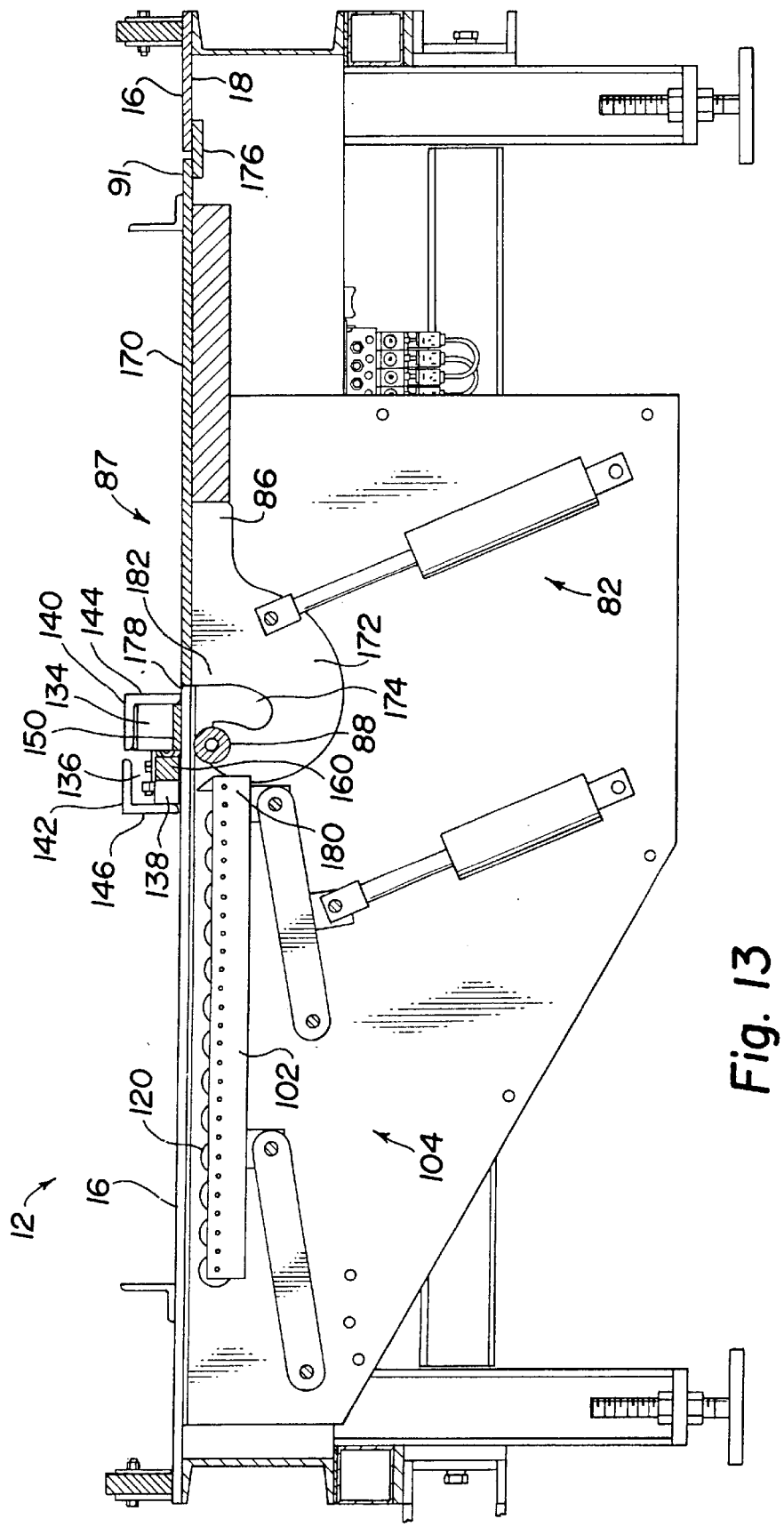
FIG. 13 is a elevational sectional view of the truss table taken along line 13—13 of FIG. 9.

FIG. 13 shows the truss assembly apparatus in cross-section taken along line 13—13 of FIG. 9. Flip-over assembly 82 is located adjacent zone A and is similar to the flip-over assembly described previously herein. Flip-over arm 86 rotates about pivot point 88. When the flip-over arm assembly is in its home position 87, as shown in FIG. 13, the flip-arm plate 170 can sit flush with the table work surface 16. This configuration prevents members of a truss from falling into assembly slots 78. The upper end 91 of the flip-over arm plate 170 preferably contacts a stop plate 176 which is fastened to the bottom surface of table plate 18. Contact between the stop plate 176 and the upper end 91 of flip-over arm 86 correctly positions the flip-arm plate 170 when the flip-over assembly is in the home position. In the home position there is preferably a small gap 178 between the lower edge of the lower end 182 of flip arm 86 and the upright leg 144 of inner jig 52. If the gap 178 is too large, it is possible for a truss to "bind", or become trapped, between the lower edge of the flip arm 86 and the jig upright 144 while the truss is being rotated by the flip arm 86 from zone A to zone C. Preferably the gap 178 is smaller than any dimension of the trusses typically manufactured on the truss table to prevent such binding from occurring.

Flip-over assembly legs 172 extend from pivot point mounting 88 to flip-arm plate 170. Preferably the flip-over arm 86 comprises two spaced-apart parallel flip-arm legs 172 are rotatably connected to the pivot mounting 88. The clearance space 184 between the legs 172, as best seen in flip-over arm detail FIG. 15, allows at least a portion of the inner-end 180 of lift-out arm 102 to rest between the legs 172 when the lift-out assembly 100 is in its home position 103. Thus the inner-end 180 of the lift-out arm 102 "overlaps" the flip-arm leg 172, seen in FIG. 13. This overlap is not necessary to the practice of the invention, but allows a closer fit between the moving parts of the truss movement assembly 80.

Figure 14:
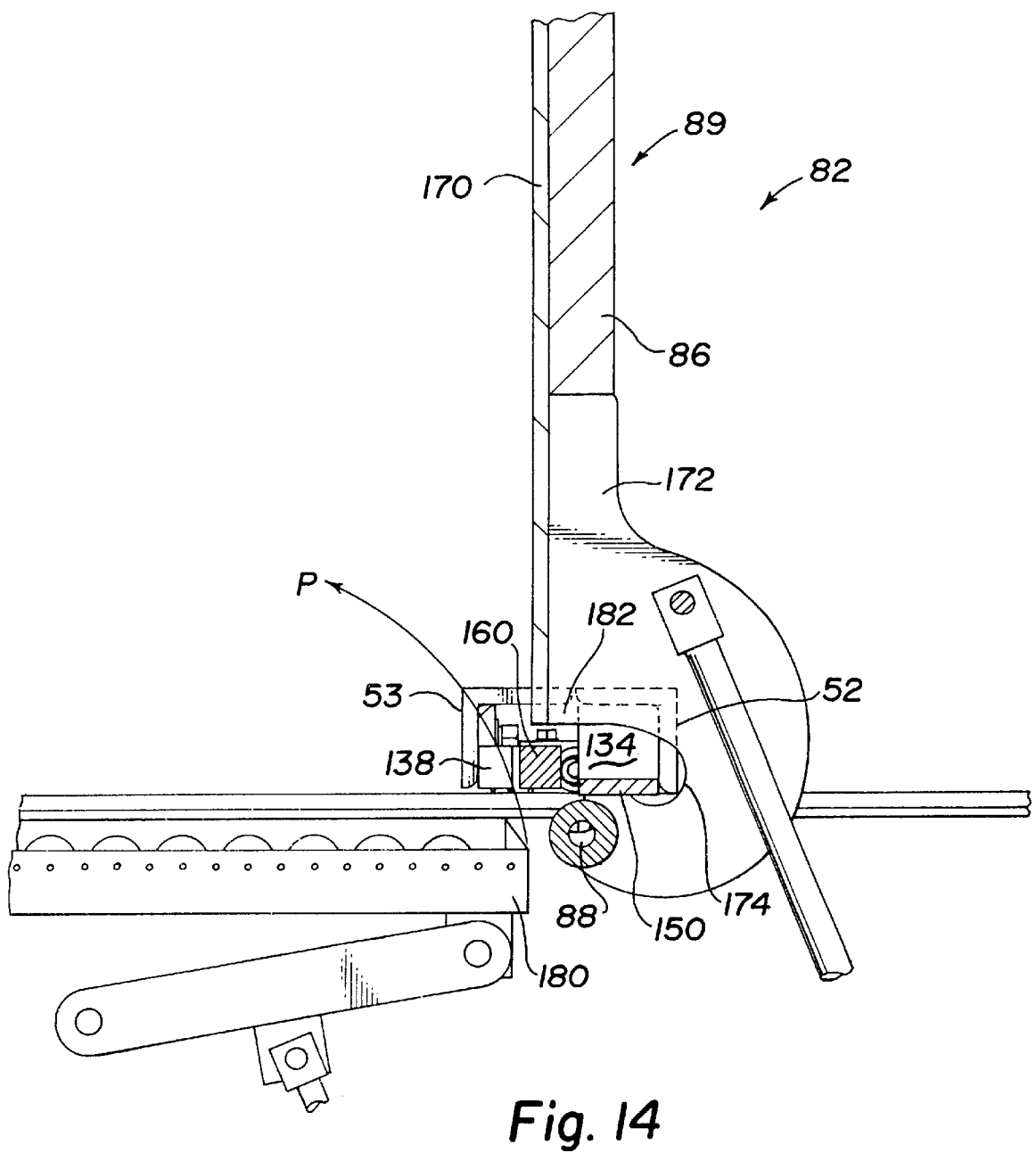
FIG. 14 is a detail of FIG. 13 with the flip-over arm in the extended position.
Figure 15:
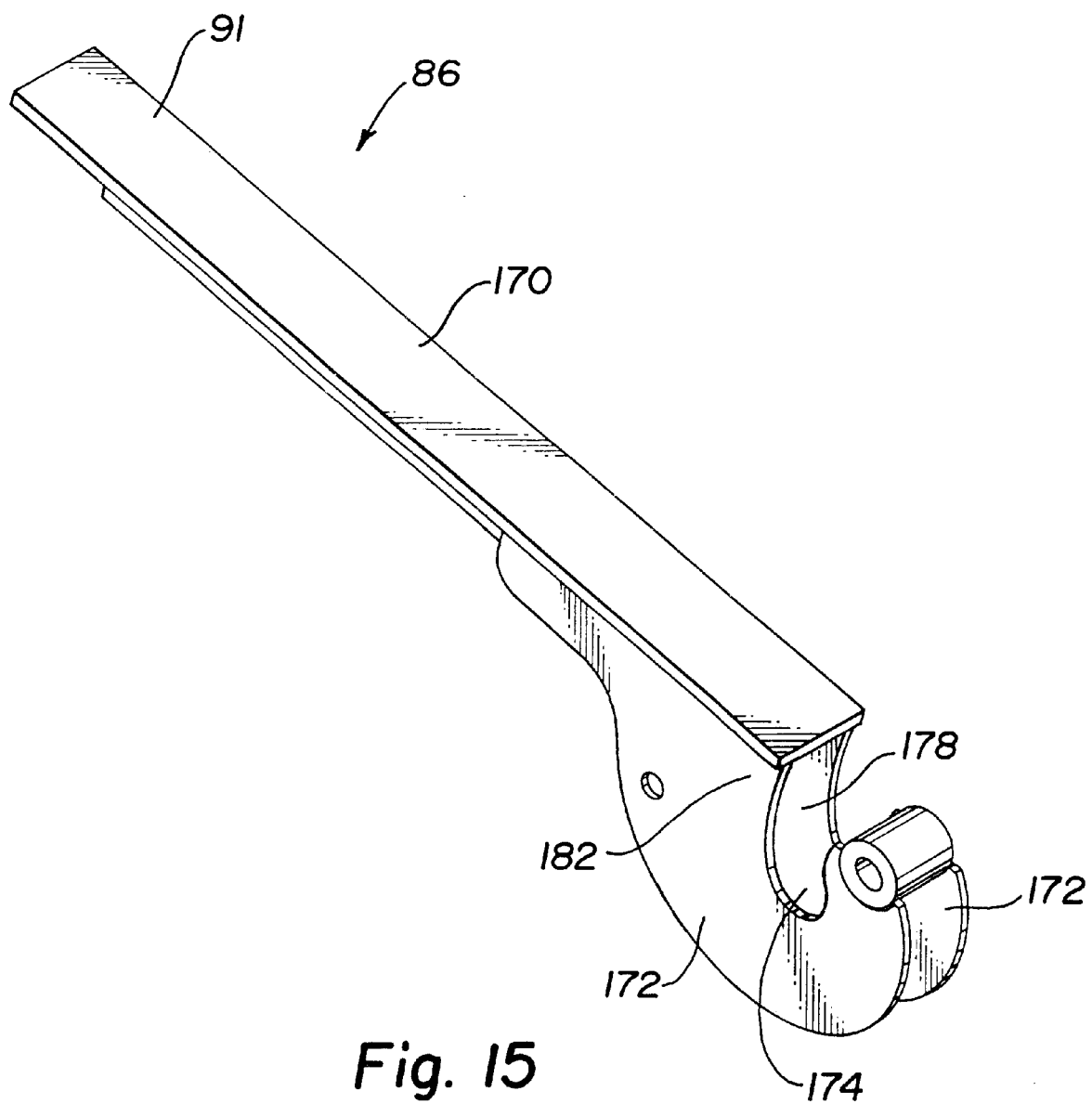
FIG. 15 is an isometric view of a flip-over arm of the truss table.

Flip-over arm 86 preferably is configured to have a clamp-rail recess 174. The clamp-rail recess 174, or inner-jig recess, allows movement of the flip-over arm 86 to an extended position 89, as shown in FIG. 14, without contacting the inner jigs 52 and 53. When the flip arm 86 is in the extended position 89, the clearance portion 150 of the jig connector 130 and the clearance portion 160 of the jig connector 132 are positioned in clamp-rail recess 174 of the flip arm 86. Further, at least a portion of the lower end 182 of flip arm 86 is positioned in flip arm recesses 134 and 136. This configuration allows the flip arm 86 to rotate at least to an extended position perpendicular to the truss table work surface 16, as shown, and allows the flip-over arm to be positioned proximate to the inner jigs 52 and 53. The flip-over arm 86 can be rotated past the perpendicular position if desired. The interlocking recesses 134, 136 and 174 allow the lower end 182 of the flip-over arm 86 to move into and through the area adjacent the inner jigs 52 and 53. This helps ensure that a truss being assembled in zone A can be completely moved into zone C for further assembly.

As explained herein, the jig connector 132 of inner jig 53 creates a lift-out arm recess 138. The lift-out arm recess 138 allows the inner-end 180 of the lift-out arm 102 to travel along a path P through the recess 138. Such an arrangement helps ensure that no part of a truss being lifted from zone C extends beyond the inner-end 180 of the lift-out arm 102 when the truss is lifted off of the table surface 16. As explained previously, lift-out arm stop block 122 prevents the truss from rolling, on rollers 120, off the inner-end 180 of the lift-out arm 102.

A plurality of flip-over assemblies and lift-out assemblies, each with corresponding flip-arm, lift-out arm and clamp-rail recesses can be utilized along the length of the truss table. The plurality of flip-over arms correspond and move through the assembly slots 88 in the table 12 and correspond to the plurality of inner jig recesses 134 and 136, as seen in FIG. 9. Similarly, a plurality of lift-out arms correspond to and move through the slots 88 and lift-out arm recesses 138.

It will be apparent to those skilled in the art that not all of the interlocking recesses described herein need be incorporated into the truss table and that different combinations of the recesses can be employed. For example, the flip-arm recesses may be employed with or without the lift-out arm recess being present. Similarly, the flip arm can be designed to travel only as far as the flip-arm recess 134 of the inner jig 52, thereby eliminating the need for flip-arm recess 136 of inner jig 53. Further, the exact shapes of the recesses, jig connectors, jigs and flip-over and lift-out arms can vary without departing from the spirit of the invention.

In utilizing the truss assembly apparatus 10, precut wooden truss members 42 and 44 are arranged in zone A of the truss table 12 on the working surface 16. Simultaneously, a semi-finished truss 22 is positioned in zone C. The clamping assemblies 50 are actuated, moving the inner jigs 52 and 53 outward toward the outer jigs 54 and clamping the trusses 20 and 22 between the jigs. End stops and other devices known in the art may be added to assist in the proper arrangement of the truss members. Connector plates 46 are placed over the joints between the truss members in both zones A and C and are usually manually tapped into the wood so that they will hold their positions during pressing. The gantry press 14 moves along the length of the table embedding the connector plates 46 into the wood. The clamping assemblies 50 are returned to their original home positions 74 such that the jigs are no longer clamping the trusses. In the home positions, the clamping assemblies preferably have little or no space between them in zone B, at the center of the table. This is, in part, accomplished by positioning the jig actuators 68 below the table surface 16.

The lift-out assemblies 100 are then actuated to move the lift-out arms 102 into extended positions 105, that is, to move the lift-out arms upwardly through the assembly slots 78 from below the table surface 16 and engage the truss 22 thereby raising it out of zone C and moving it toward the outer rails 32 of the table. Preferably the lift-out arm 102 include rollers 120 and move in the extended position 105 to extend over the outer rails 32 for ease of removal of the truss 22 from the truss table 12. The lift-out arm 102 may also include stop blocks 122 to prevent the truss 22 from rolling off the lift-out arms 102 the wrong direction. The inner-ends 180 of the lift-out arms 102 preferably travel along paths P which pass through lift-out arm recesses 138 of inner jig 53. The lift-out arms 102 are lowered back into position under the table surface 16.

The flip-over assemblies 82 are then activated. The flip-over arms 86 are rotated from a home position 74 with flip-arm plates 86 flush with the work surface 16 to an extended position 76, thereby engaging the truss 20 and lifting it from zone A while simultaneously rotating it along its longitudinal axis L. The lower ends 182 of the flip-over arms 86 preferably move into the flip-arm recesses 134 of the inner jig 52 and into the flip-arm recesses 134 of the inner jig 53 when the flip-over arm is in the extended position 76. Preferably, the clearance portions 150 and 160 of the inner jigs 52 and 53 are positioned in the clamp-rail recesses 138 of the flip-over arms 86 when the flip-over arms are in the extended position. The flip-over arms 86 deposit the truss 20 in zone C with the connector plates 46 facing downward. The flip-over arms 86 are then returned to their home positions 74. The order of the steps may vary without departing from the spirit of the invention. The process may be repeated as desired.

We claim:

1. A truss assembly apparatus for assembling a truss, said apparatus comprising:

a truss table having a work surface, said work surface having a first and second assembly zone;

a first clamping assembly having a movable first clamp rail for clamping the truss in said first assembly zone, the first clamp rail having a flip-arm recess therein; and a flip-over assembly having a flip-over arm movable relative to said work surface for moving the truss from a first truss position in said first assembly zone to a second truss position in said second assembly zone, the flip-over arm having a lower end, the lower end movable into the flip-arm recess of the first clamp rail.

2. A truss assembly apparatus as in claim 1 wherein said flip-over arm is movable between a home position adjacent said work surface and an extended position and wherein the lower end of the flip arm is positioned in the flip-arm recess when the flip-over arm is in the extended position.

3. A truss assembly apparatus as in claim 2 wherein the flip-over arm is perpendicular to the work surface when the flip-over arm is in the extended position.

4. A truss assembly apparatus as in claim 3 wherein at least a portion of said flip-over arm extends over said second assembly zone when said flip-over arm is in said extended position.

5. A truss assembly apparatus as in claim 1 wherein the flip-over arm is movable about a single pivot point.

6. A truss assembly apparatus as in claim 1, the first clamping assembly further comprising a plurality of clamping rails for clamping the truss in said first assembly zone, the plurality of clamping rails having a plurality of flip-arm recess therein; and the flip-over assembly further comprising a plurality of flip-over arms, each flip-over arm having a lower end, each of the lower ends movable into a corresponding flip-arm recess in the plurality of clamping rails.

7. A truss assembly apparatus as in claim 1 wherein the first clamp rail further comprises a plurality of flip-arm recesses and wherein the flip-over assembly further comprises a plurality of flip-over arms, each flip-over arm having a lower end, the lower ends each movable into a corresponding flip-arm recess in the first clamp rail.

8. A truss assembly apparatus as in claim 1 further comprising a second clamping assembly having a movable second clamp rail for clamping the truss in said second assembly zone, the second clamp rail having a flip-arm recess therein; and wherein the lower end of the flip-over arm is movable into the flip-arm recess of the second clamp rail.

9. A truss assembly apparatus as in claim 8 wherein said flip-over arm is movable between a home position adjacent said work surface and an extended position and wherein the lower end of the flip arm is positioned in the flip-arm recess when the flip-over arm is in the extended position.

10. A truss assembly apparatus as in claim 8 wherein the first clamp rail further comprises a plurality of flip-arm recesses and wherein the flip-over assembly further comprises a plurality of flip-over arms, each flip-over arm having a lower end, the lower ends each movable into a corresponding flip-arm recess.

11. A truss assembly apparatus as in claim 8 wherein the second clamp rail further comprises a plurality of flip-arm recesses and wherein the flip-over assembly further comprises a plurality of flip-over arms, each flip-over arm movable into a corresponding flip-arm recess in the second clamp rail.

12. A truss assembly apparatus as in claim 8 further comprising a lift-out assembly having a lift-out arm movable relative to the work surface for moving a truss from the second truss position to a finished position spaced from the work surface, the lift-out arm having a first end; and wherein the second clamp rail further comprises at least one lift-out arm recess, the first end of the lift-out arm movable into the lift-out arm recess.

13. A truss assembly apparatus as in claim 12 wherein the lift-out assembly further comprises a plurality of lift-out arms each having a first end; and wherein the second clamp rail further comprises a plurality of lift-out arm recesses, the first ends of the plurality of lift-out arms movable into corresponding lift-out arm recesses.

14. A truss assembly apparatus as in claim 12 wherein the lift-out arm is movable along a path between a home position and an extended position, wherein the first end of the lift-out arm passes through the lift-out arm recess as the lift-out arm moves along the path.

15. A truss assembly apparatus as in claim 1 wherein the flip-over arm has a clamp-rail recess, wherein the flip-over arm is movable such that at least a portion of the first clamp rail is in the clamp-rail recess.

16. A truss assembly apparatus as in claim 8 wherein the flip-over arm is movable such that at least a potion of the second clamp rail is in the clamp-rail recess.

* * * * *